United States Patent [19]

Fleischer

[11] 4,063,087
[45] Dec. 13, 1977

[54] REDUCING NOISE IN URANIUM EXPLORATION

[75] Inventor: Robert L. Fleischer, Schenectady, N.Y.

[73] Assignee: Terradex Corporation, Walnut Creek, Calif.

[21] Appl. No.: 715,225

[22] Filed: Aug. 18, 1976

[51] Int. Cl.$^2$ .............................................. G01V 5/00
[52] U.S. Cl. ................................... 250/253; 250/472
[58] Field of Search ....................... 250/253, 472, 473

[56] References Cited

U.S. PATENT DOCUMENTS 3,665,194  5/1972  Alter et al. ........................... 250/253

Primary Examiner—Davis L. Willis
Attorney, Agent, or Firm—Townsend and Townsend

[57] ABSTRACT

A method and apparatus are described for reducing or removing the background noise caused by thoron gas ($^{220}$Rn) in uranium exploration conducted by the detection of radon gas ($^{222}$Rn) emanating from the ground. This is accomplished by the use of a number of alpha particle detectors, each of which is disposed in a protective enclosure. A barrier which permits, but deliberately retards, the passage therethrough of gases is disposed in the path to be traversed before such gases can reach the alpha particle detector. The increase in the transit time made necessary by requiring soil gases to move through the barrier should be sufficiently long to allow the decay of most of the thoron, thereby eliminating its contribution to the total signal reflected at the detector.

11 Claims, 1 Drawing Figure

U.S. Patent  Dec. 13, 1977  4,063,087
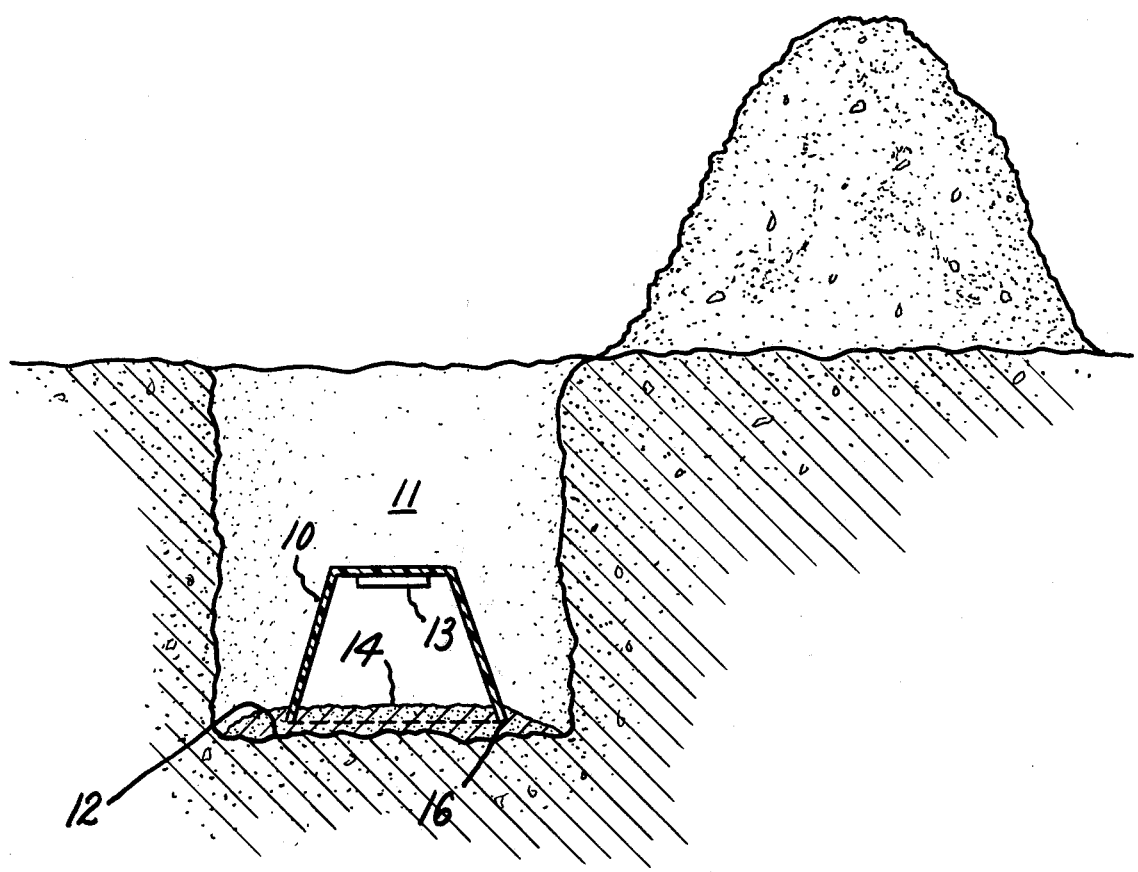

REDUCING NOISE IN URANIUM EXPLORATION

BACKGROUND OF THE INVENTION

One method and apparatus by which the presence and concentration of radon and its alpha-emitting daughters can be effectively detected and monitored is disclosed in U.S. Pat. No. 3,665,194 — Alter et al., incorporated by reference. A sheet of solid state track-registration material (the alpha particle detector) is disposed in a protective environment at a location to be checked for the emission of radon. If the track-registration material becomes irradiated by alpha particles, minute damage "tracks" are created therein, which tracks can be enlarged and made visible by contact with a reagent to which the tracks display preferential chemical reactivity.

Ordinarily this uranium exploration is carried out by burying in the earth inverted cup-shaped housings containing the track-registration material. The housings are set forth in a predetermined arrangement (e.g. a grid system) and permitted to remain for a preselected period of time (e.g. four weeks). Thereafter the housings and detectors are removed, the detectors are subjected to a chemical etching solution and the number of tracks etched on each detector is counted by microscopic inspection. Correlation of the results from the various housings are made in order to determine whether subsurface uranium ore is present and where.

Another method of uranium exploration substitutes an electronic solid state detector of alpha particles for the track registration material of the method described hereinabove. These electronic detectors may be used repetitively either in the same or new locations.

DESCRIPTION OF THE INVENTION

A method and apparatus are described for reducing or removing the background noise caused by thoron gas ($^{220}$Rn) in uranium exploration conducted by the detection of radon gas ($^{222}$Rn) emanating from the ground. This is accomplished by the use of a number of alpha particle detectors, each of which is disposed in protective enclosure. A barrier which permits, but deliberately retards, the passage therethrough of gases is disposed in the path to be traversed before such gases can reach the alpha particle detector. The increase in the transit time made necessary by requiring soil gases to move through the barrier should be sufficiently long to allow the decay of most of the thoron, thereby eliminating its contribution to the total signal reflected at the detector.

The barrier should not in itself be a source of substantial quantities of either $^{220}$Rn or $^{222}$Rn. The material of which the barrier is made should not be soluble in water whereby it can remain stable, when in contact with soil. The enclosure, e.g. cup, should have imperforate side and (in the inverted position) top areas.

BRIEF DESCRIPTION OF THE DRAWING

The subject matter of the instant invention for which protection is sought is presented as claims at the conclusion of the written description of the invention set forth herein. The description sets forth the manner and process of making and using the invention and the accompanying drawing forms part of the description for schematically illustrating the invention and the best mode. The view shown in section in the drawing schematically illustrates utilization of the instant invention in uranium exploration.

MANNER AND PROCESS OF MAKING AND USING THE INVENTION

In order to facilitate the description of this invention reference will be made to the application thereof in the method disclosed in the aforementioned U.S. Pat. No. 3,665,194 in which a solid state track-detector is used as the alpha particle detector. This invention is equally applicable when other forms of alpha particle detector are employed.

In uranium exploration by the method described in U.S. Pat. No. 3,665,194 cup 10 would be placed in excavation 11 so as to rest on the soil 12 at the bottom thereof. Typically a board would be used to cover the hole and this in turn would be covered with dirt from the excavation thereby burying cup 10. This procedure would be repeated with a number of such cups in some desired pattern, the cups remaining buried for the test period. Mounted within each cup is a piece, or sheet, 13 of alpha particle track detector material, preferably cellulose nitrate, to measure the emanation from the ground below of the gaseous radon isotopes $^{220}$Rn and $^{222}$Rn. The $^{222}$Rn gas is a decay product of uranium and, therefore, the detection of such emanations would be an indication of the presence of uranium in the earth. The other alpha particle-emitting gas, $^{220}$Rn, is a decay product of thorium and, hence, tracks induced thereby in track detector 13 constitute an unwanted background caused by alpha particle emissions from thoron gas entering the mouth of cup 10, instead of permitting gases leaving the soil through surface 12 to enter directly into the internal volume of cup 10, a layer 14 of a porous medium is disposed between surface 12 and sheet 13 (or other alpha particle detector). The sides and top of cup 10 are imperforate in order to prevent the shortcircuiting by soil gases around layer 14. Thus, any soil gases reaching the sheet of track detector material 13 must first pass through layer 14. A zone, or volume, at least 6.0 centimeters thick must remain in the cup between the upper surface of layer 14 and the underside of the surface of sheet 13 so that in passing through this zone of air, the alpha particles are slowed sufficiently that they can be detected by this form of alpha particle detector.

In the arrangement shown, the lip 16 of cup 10 is embedded in layer 14 so that the cups anchored and the mouth thereof is closed off by the porous medium. If a solid porous disc is to be employed as porous medium 14, it may be preferable to rest the disc on surface 12 and, in turn, to rest the lip 16 of cup 10 on the upper surface of the disc.

The thickness of the porous medium 14 should be appreciably greater than the mean diffusion distance for $^{220}$Rn in the given porous material, (e.g. about 2 cm. in loose soil) and appreciably less than the mean diffusion distance for $^{222}$Rn in the same porous medium (e.g. 150 cm. in loose soil). Thus, the thickness will depend upon the porosity of the porous material and may be in the range of from about 0.1 cm. to about 150 cm. The preferred thickness for the layer of porous medium would be in the range of from about 1 cm. to about 4 cm.

The thickness of the layer of porous medium should be sufficient to insure the decay of most of the alpha particles emitted by any $^{220}$Rn thay may be present in the soil gases passing therethrough. This decay occurs while the thoron gas is diffusing through the medium.

Some radon may also decay in transit therethrough and the decay products produced collect in the porous material. By way of example, diffusion through a 4 cm. thickness of a suitable medium having an Rn diffusion constant D = 0.05 cm.$^2$/sec. will reduce the alpha particle emitting capability of the thoron component present in the soil gases to 13.5% of its initial value. Since the typical $^{220}$Rn contribution is less than 50% of the total signal encountered and, therefore, less than 50% of the total to which sheet 13 would be subjected, the $^{220}$Rn contribution would be reduced to less than 7% of the total signal. This amount would be comparable to the statistical uncertainty with which radon measurements are normally made.

Almost any porous material, solid or particulate, insoluble in water and in which the pores are interconnecting may be used, e.g. sand, felt or other fibrous sheet or mat, porous plastic, fritted glass, porous silica body, etc. Ideally in order to determine whether the porous material to be employed is not a source of objectionable quantities of $^{220}$Rn and/or $^{222}$Rn comparison is made with the background to be encountered (i.e. the activity of the soil where measurements are to be made. As much as 50% of the background reading can be tolerated. The comparison can readily be made by comparing the readout (e.g. over a 30 day period) from the porous medium itself with the readout from a sample of the soil. Preferably the activity of the porous medium will be less than 10% of the soil background activity.

This invention, in addition to having the utility described hereinabove with respect to uranium exploration, can also be advantageously utilized in thorium exploration. Thus, if readings are first made with the usual arrangement described hereinabove, and then measurements are repeated using the intervening porous medium according to this invention, the differences, if any, recorded between the first and second sets of readings will supply the requisite information on the $^{220}$Rn levels and, therefore, indicate the presence or absence of thorium.

BEST MODE CONTEMPLATED

A hole about 2 feet deep is prepared in the soil. The bottom of the hole is covered with a layer about 4 cm. thick of high silica content sand. The content of uranium and/or thorium should be sufficiently low so that the emission of $^{220}$Rn and/or $^{220}$Rn will be less than 5% of the background activity for these gases.

An imperforate plastic cup is placed in the inverted position with the lip thereof embedded in the sand. Mounted in the cup (as shown in the drawing) is a sheet of cellulose nitrate as the alpha particle detector. The cup dimensions are such that the distance from the top of the layer of sand to the surface of cellulose nitrate is at least 6.0 cm. The cup with the layer of sand in place is buried as described above and the method comprising waiting about 4 weeks and then recovering the cups for readout applies.

What I claim as new and desire to secure by Letters Patent of the United States is:

1. Radon detection apparatus for uranium-ore prospecting comprising in combination:
   an imperforate protective housing defining an enclosed volume and having an opening therein, said housing being adapted for burial in the earth with said opening disposed at the underside thereof,
   an unshielded body of alpha particle detection material disposed within said housing and secured thereto for direct exposure to soil gases entering said enclosed volume through said opening and
   a quantity of a porous medium for closing off said opening whereby soil gases leaving the soil and entering said housing must traverse the thickness of said porous medium, said porous medium being substantially free of content emitting either $^{220}$Rn or $^{222}$Rn.

2. The apparatus recited in claim 1 wherein the porous medium is low-uranium, low-thorium content sand.

3. The apparatus recited in claim 1 wherein the porous medium is a solid porous silica disk.

4. The apparatus recited in claim 1 wherein the thickness of the quantity of a porous medium is in the range of from about 0.1 cm. to about 150 cm.

5. The apparatus recited in claim 4 wherein the thickness of the quantity of porous medium is in the range of from about 1 cm. to about 4 cm.

6. In the method of prospecting for alpha-emitting ore bodies wherein a series of protective housings are buried in the earth in a predetermined series of locations, each housing defining an enclosed volume and having an opening therein and containing an unshielded body of alpha particle detection material mounted therein spaced from said opening, said housings being buried with said opening disposed at the underside thereof, and thereafter, after a predetermined period of exposure, a determination is made of the extent of exposure of said alpha detection material to alpha particles during said period, the improvement comprising the step of:
   disposing a retarding barrier at each housing interposed between the earth and said alpha particle detection material, said barrier delaying the passage of soil gases therethrough a sufficiently long period of time to allow the decay of substantially all of any $^{220}$Rn content in said soil gases.

7. The improvement recited in claim 6 wherein the barrier is a porous medium, said porous medium being substantially free of content emitting either $^{220}$Rn or $^{222}$Rn.

8. The improvement recited in claim 7 wherein the porous medium is a layer of low uranium, low thorium sand.

9. The improvement recited in claim 7 wherein the porous medium is a solid porous silica disk.

10. The improvement recited in claim 6 wherein the ore to be located is uranium ore.

11. The improvement recited in claim 6 in which readings are taken at the same locations both with and without the retarding barrier whereby the difference in the readings will indicate whether thorium ore is present.

* * * * *